INVENTOR
D.C. GLOGE
BY
ATTORNEY

# United States Patent Office 3,494,699
Patented Feb. 10, 1970

3,494,699
OPTICAL BEAM POSITION SENSOR
Detlef C. Gloge, Matawan, N.J., assignor to Bell Telephone Laboratories, Incorporated, Murray Hill and Berkeley Heights, N.J., a corporation of New York
Filed Dec. 9, 1966, Ser. No. 600,565
Int. Cl. G01b *11/27;* G02b *5/14*
U.S. Cl. 356—121                                       5 Claims

ABSTRACT OF THE DISCLOSURE

An optical beam position sensor for use in an optical waveguide, comprising means for sensing the distribution of optical wave energy reflected from the incident surface of a lens in said waveguide. While most of the wave energy incident upon the lens is transmitted therethrough, some energy is inevitably reflected by the lens. This reflected energy, which is normally lost, is used as a means for sensing the beam position and for generating a position-correcting voltage, if required.

---

This invention relates to optical beam position-sensing arrangements for use in optical waveguiding systems.

The advent of the optical maser, or laser, with the attendant availability of substantially single frequency, coherent wave energy in the optical frequency range, has made feasible communication by means of modulated optical beams.

Various arrangements, employing lens of both the gaseous variety and the solid variety, have been proposed for guiding optical wave energy over long distances. Such waveguiding systems, however, have certain practical limitations which have been recognized, and which require rectification if these systems are to become commercially attractive. One of these limitations relates to the deviation in the direction of propagation of the optical beam due to misalignment of the optical waveguide as a result of both intentional and unintentional bends in the system. Accordingly, in any practical system, means must be provided to compensate for this deviation. Typically, information as to the nature of the compensation required is provided by optical sensing elements distributed about the wavepath. These elements monitor the direction of propagation of the optical beam and generate correcting signals which are then coupled to suitable control means which effect the necessary change in the beam direction.

An effective sensing system is characterized by a minimum of interference with the beam being monitored, and by a high degree of sensitivity to the slightest change in the beam direction. In accordance with the present invention, these characteristics are realized in a sensing system that is responsive to reflected radiation. Advantageously, the lenses in an optical waveguide are highly transmissive, so that most of the wave energy incident thereon is transmitted through the lenses. However, some of the energy is inevitably reflected by the lenses. Normally, this reflected energy is simply absorbed and lost. A beam position sensor in accordance with the present invention, however, senses the spacial distribution of the reflected energy and uses this information to generate the necessary correcting signal.

It is an advantage of the invention that the sensing elements are located out of the wavepath, and that energy that would otherwise be wasted, is now used to obtain waveguiding information. Thus, there is absolutely no interference by the sensing elements with any of the useful portion of the optical beam. In addition, the sensing elements are placed at a distance from the reflecting surface of the lens. Hence, the slightest deviation of the beam at the reflecting lens, appears as a large displacement at the sensing elements. This has the effect of significantly increasing the sensitivity of the system.

These and other objects and advantages, the nature of the present invention, and its various features, will appear more fully upon consideration of the various illustrative embodiments now to be described in detail in connection with the accompanying drawings, in which.

Figure 1:
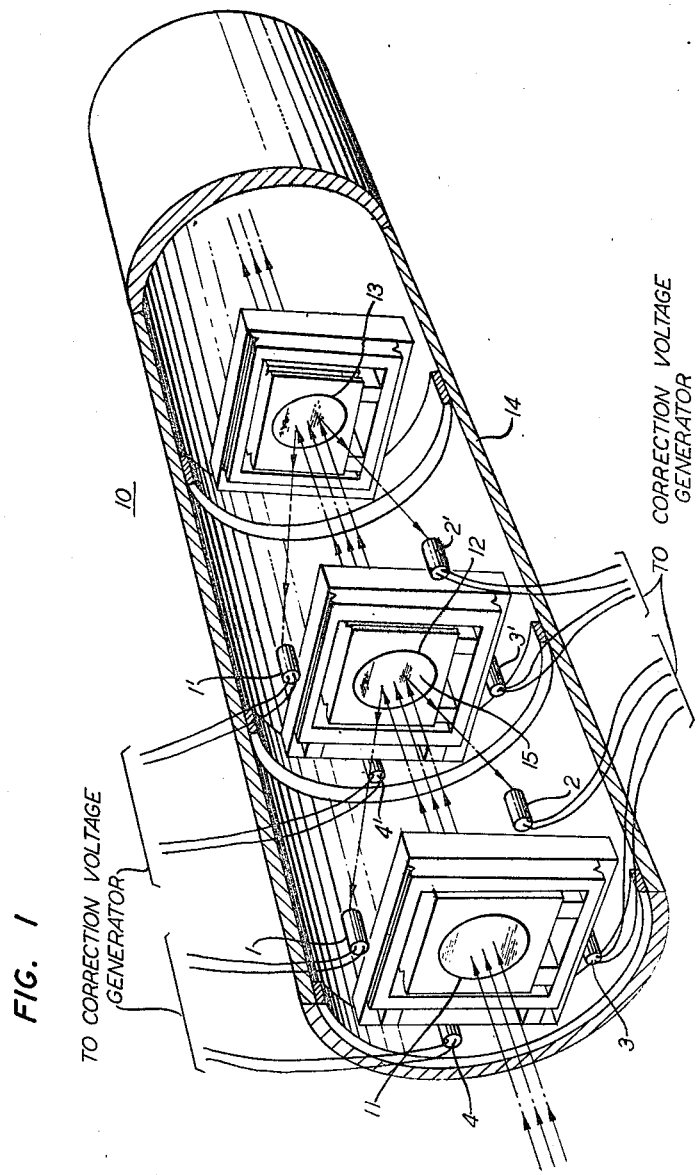
FIG. 1 shows an arrangement of beam position-sensing elements disposed about an optical waveguide in accordance with the present invention.

Referring to the drawing, FIG. 1 shows schematically a section of optical waveguide 10 including three adjacent lenses 11, 12 and 13 supported within an enclosure 14, and two sets of beam-position sensors disposed along said waveguide. As illustrated, each set of sensors comprises four photosensitive elements 1, 2, 3 and 4 and 1', 2', 3' and 4', symmetrically distributed about the wavepath. In order not to interfere with the propagating beam, the sensors are advantageously located out of the optical wavepath. While only two sets are shown, it is understood that in a long distance waveguide, there would be many more position-sensing elements distributed throughout the system. For purposes of explanation, only elements 1, 2, 3 and 4 are referred to in the following discussion.

With the direction of propagation being from lens 11 toward lens 12 as indicated by the arrowheads on the ray lines, the photosensitive elements 1, 2, 3 and 4 are directed towards lens 12 so as to be exposed to the wave energy reflected from the incident surface 15 of lens 12.

When the beam is centered, all of the photosensitive elements are equally illuminated by the energy reflected from lens 12. If, however, the beam is misdirected, either because it is propagating at an angle to the guide axis, or because the beam axis is transversely displaced from the guide axis, the reflected energy is correspondingly displaced and the photosensitive elements are unequally illuminated. As a result of this imbalance, a net correction signal is generated which can then be used to redirect the beam and, thereby, to correct the existing misdirection.

The photosensitive elements can be either photocells or photoresistors, connected in any one of many ways. Typically, opposite pairs of elements operate together to control the beam direction along two mutually perpendicular directions. Thus, in FIG. 1, elements 1 and 3 function as a unit to provide vertical correction, while elements 2 and 4 function as a second unit to provide horizontal correction.

Figure 2:
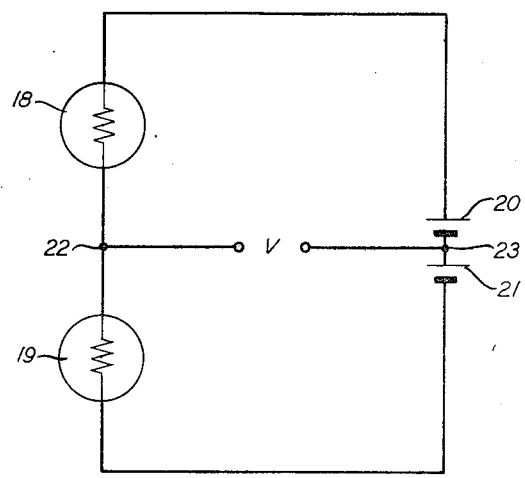
FIG. 2 shows the use of photoresistors as beam position-sensing elements.

FIG. 2 is illustrative of one of many possible correction voltage generating circuits in which two photoresistors 18 and 19 are connected in series with a pair of equal, direct current power sources, represented by the two similarly-poled batteries 20 and 21. When photoresistors 18 and 19 are equally illuminated, their resistances are the same, and the voltage V, measured between junction 22 of the two photoresistors, and junction 23 of the two batteries, is zero. If, however, the two photoresistors are unequally illuminated, their resistances are no longer equal, and there is a net output voltage developed between junctions 22 and 23 whose polarity and amplitude depend upon the sense and the extent of the imbalance in the illumination. Thus, the voltage V provides a direct indication of the sense and magnitude of the beam redirection required for proper beam alignment.

The correction voltages generated by the photosensitive elements can be used in either one of two ways. They can be coupled to beam position control means which reposition the lens following the lens from which the reflected energy is derived, or the correction voltages can be coupled to beam position control means used to reposition the lens which precedes the lens from which the reflected energy is derived. Thus, referring to FIG. 1, either lens 13 following lens 12, or lens 11, preceding lens 12, can be repositioned as a means of redirecting the beam. Which of these two alternative arrangements is used depends upon the specific situation. However, in either instance, the lens to be repositioned is supported in a manner to permit the required movement.

Figure 3:
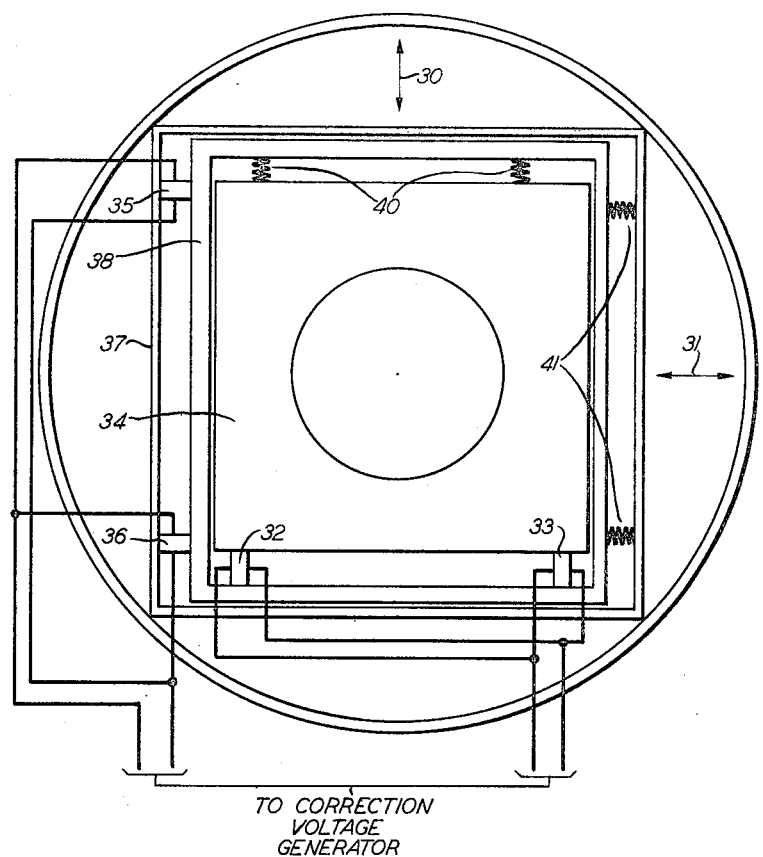
FIG. 3 shows a lens-support arrangement capable of movement in two mutually perpendicular directions.

FIG. 3, given by way of example, shows the details of a lens-support arrangement capable of movement in two mutually perpendicular directions, as indicated by the double arrows 30 and 31. Movement is controlled in the vertical direction by means of springs 40, and two piezoelectric elements 32 and 33 which support a lens holder 34. The piezoelectric elements are activated by the correction voltage generated by one pair of photosensitive elements. Movement in the horizontal direction is controlled by a second pair of springs 41, and a second pair of piezoelectric elements 35 and 36 which are located between frame members 37 and 38. Piezoelectric elements 35 and 36 are activated by the control voltage generated by the second pair of photosensitive elements.

The above-described arrangement is particularly useful in systems employing lenses having focal lengths of the order of ten inches or less and where only small displacements are needed. Where greater movement is needed, other means such as motors can be used to vary the lens position.

The use of reflected energy as a means for sensing the beam direction has two advantages. Since the reflected energy is directed out of the system, the sensing elements can be located out of the wavepath. Thus, in a system, in accordance with the invention, the sensing elements do not interfere with the useful portion of the optical beam. Secondly, by using the reflected energy, the sensing elements can be located at a distance from the reflecting lens. This increases the sensitivity of the sensing system since a slight change in beam direction produces a large displacement at the sensing elements.

While four discrete sensing elements are shown in FIG. 1, it is understood that this is only by way of illustration. More efficient arrangements, using annular prisms, as disclosed in the copending application by E. L. Chinnock, Ser. No. 590,380, filed Oct. 28, 1966, and assigned to applicant's assignee, can also be used. Similarly, the arrangement for positioning the lens shown in FIG. 3, is merely intended to be illustrative. Thus, in all cases it is understood that the above-described arrangements are illustrative of but a small number of the many possible specific embodiments which can represent applications of the principles of the invention. Numerous and varied other arrangements can readily be devised in accordance with these principles by those skilled in the art without departing from the spirit and scope of the invention.

What is claimed is:
1. In combination:
a section of optical waveguide including a plurality of lenses for guiding a beam of optical wave energy therealong;
means for redirecting said beam comprising:
photosensitive elements symmetrically located about said waveguide for intercepting a portion of the wave energy reflected from one of said lenses;
means coupled to said elements for generating correction voltages indicative of the sense and magnitude of the beam redirection required for proper beam alignment; and
control means responsive to said voltages for redirecting said beam.

2. In an optical waveguiding system:
means comprising a plurality of longitudinally spaced lenses for guiding an optical beam therealong;
beam position sensors disposed along said waveguide in a position to intercept a portion of the wave energy reflected from one of said lenses;
and means for electrically coupling to said sensors.

3. The combination according to claim 2 wherein said sensors comprise a plurality of photosensitive elements symmetrically disposed about said waveguide.

4. The combination according to claim 1 wherein said control means redirects said beam at a position following said one lens.

5. The combination according to claim 1 wherein said control means redirects said beam at a position before said one lens.

References Cited

UNITED STATES PATENTS

| 2,352,179 | 6/1944 | Bolsey | 356—127 |
|---|---|---|---|
| 3,198,953 | 8/1965 | Peters | 250—204 |
| 3,277,304 | 10/1966 | Vyce | 250—227 |
| 3,316,800 | 5/1967 | Kibler | 350—96 |
| 3,326,620 | 6/1967 | Maric. | |

OTHER REFERENCES

Miller, S.E.: "Directional Control in Light-Wave Guidance," The Bell System Technical Journal, vol. XLIII, No. 4, part 2, July 1964.

RONALD L. WIBERT, Primary Examiner

J. ROTHENBERG, Assistant Examiner

U.S. Cl. X.R.

350—96; 356—124, 152